No. 12,145. REISSUED AUG. 11, 1903.

H. K. WHITNER.

SAFETY APPARATUS.

APPLICATION FILED DEC. 26, 1902.

2 SHEETS—SHEET 1.

Witnesses
Edward S. Berrall.
Louis Davis.

Hiram K. Whitner Inventor
By his Attorney James A. Skilton

No. 12,145. REISSUED AUG. 11, 1903.

H. K. WHITNER.

SAFETY APPARATUS.

APPLICATION FILED DEC. 26, 1902.

2 SHEETS—SHEET 2.

Witnesses
Edward S. Berrall.
Louis Davis

Hiram K. Whitner Inventor
By his Attorney James A. Sutton

No. 12,145. Reissued August 11, 1903.

UNITED STATES PATENT OFFICE.

HIRAM K. WHITNER, OF CHICAGO, ILLINOIS.

SAFETY APPARATUS.

SPECIFICATION forming part of Reissued Letters Patent No. 12,145, dated August 11, 1903.

Original No. 519,365, dated May 8, 1894. Application for reissue filed December 26, 1902. Serial No. 136,596.

*To all whom it may concern:*

Be it known that I, HIRAM K. WHITNER, a citizen of the United States, residing at Chicago, in the county of Cook and State of Illinois, have invented certain new and useful Improvements in Safety Apparatus; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in safety apparatus, and is generally adapted to the safety of window-cleaners and like hazardous occupations.

The object of my invention is to not only facilitate the work of those in exposed elevated positions by constructing a device that may be quickly applied, but by such means as I hereinafter show I insure greater stability at less cost than has heretofore been done. I am aware that staples and eyebolts have been used in combination with snap-hooks, the latter terminals to a belt worn upon the person. Such combinations, because of their cost and nature of application, are single, not having a reserve to depend upon in case of mishap, staples are impracticable, and eyebolts, because of enlarged exposure in proportion to shank inserted, are susceptible to disarrangement by blows inflicted by awning-hangers, sash-cord repairmen, by the incessant handling of fly-screens, &c. The solid headed bolts, commonly known as "lag-bolts," such as I preferably use, offer less exposure and are not liable to be tampered with playfully; besides, their cost offers no objection to their duplication. Hence the reserve so desirable.

My invention consists in the construction and arrangement of parts, as hereinafter set forth.

Figure 1:
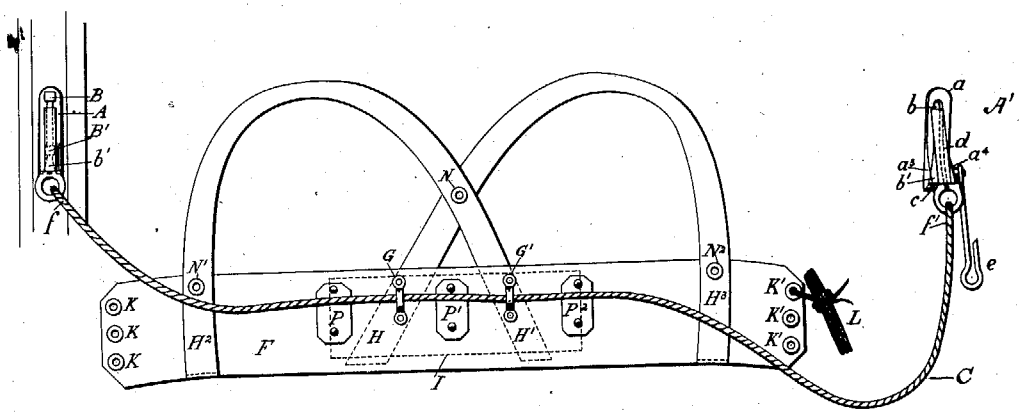
Figure 2:
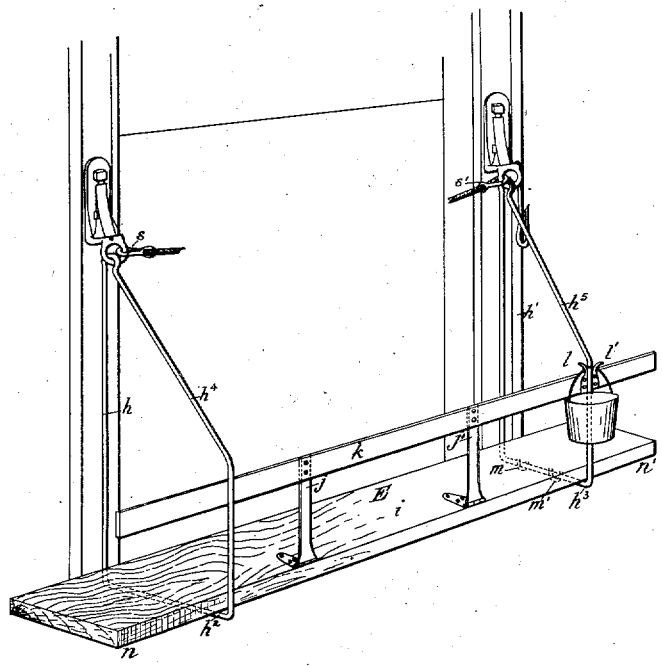

Figure 1 shows my safety apparatus attached to one side of a window-frame. Fig. 2 shows a balcony attached to the sides of a window-frame and embodying my improved anchorage in combination with a seat or foot-rest.

In Fig. 1, A and A′ are slotted terminals or anchorages. Terminal A is shown in engagement with the protruding shanks of so-called "permanent" fixtures B and B′, preferably a duplication of solid-headed screw-bolts known as "lag-bolts." Terminal A′ shows its parts in detail, they being similar to those of terminal A in the main, but is detached from its so-called "permanent" fixture found on the opposite side of a perfect window-frame, but omitted in the drawings.

*a* is a slotted plate having a boltway *b* three-eighths of an inch in width and about four inches in length, widening at its mouth *b′* and ending in a span bridge or bench *c* immediately over said mouth of the slot and high enough to admit of the free passage of the protruding bolt-head of the so-called "permanent" fixture. The under side of said bench I preferably bevel or slope, and to said beveled surface I rivet the retaining plate-spring *d*, giving it the proper tension. It would not be a departure from the spirit of my invention to use a retaining spiral spring, trigger, hammer, cam, or bolt in combination with said slotted plate, any one of which would equally well retain said slotted plate in position, as shown in Fig. 1, terminal A. Such substitution would be but equivalents thereof. Pierced enlargements of said benches are provided with ordinary rope-eye thimbles *f* and *f′* to receive the jacket-rope or stay C, thereby forming an anchorage of great stability and simplicity. Said slotted plate *a* will be greatly strengthened if provided with herring-bones $a^3$ and $a^4$, Fig. 1, terminal A′. To the right-hand herring-bone of the right-hand terminal, as shown in terminal A′, I secure the pail-hook *e*.

I preferably use two protruding lag-bolts to perfect each anchorage. In fact, in practice I deem two (B and B′) about three inches apart indispensable to assure stability and preclude any possibility of wrenching or twisting. The shank should be five-sixteenths of an inch in diameter, the inserted portion threaded with a so-called "wood-screw," total length under the head two to two and a half inches. Each side of a window-frame or a sash-frame presents points of insertion for said dual lag-screws, leaving on the one hand the place usurped by fly-screens, while on the other hand we find the awning-fixtures; but it would not be a departure from the spirit of my invention to have but one lag-screw in each anchorage.

As hereinbefore mentioned, I do not limit myself to any particular method of keying. Any means that will block the passage of the protruding heads of said lag-screws in their accidental escape from the slot in question will be equivalents of what I have shown and preferably employ.

The portable slotted terminal has in or at or through its under side a longitudinal slot or boltway which is provided at its lower open end with a mouth, span-bridge, or passage-way to receive and admit of the passage by a longitudinal movement in line with the length of the slot of the protruding bolt-head or headed bolt, with the opposite sides of the same facing the sides of this mouth or passage-way, the head of the bolt being left projecting beyond and overlapping the sides of the slot after it has passed through the mouth, span-bridge, or passage-way. The bolt the head of which is caused to protrude or project beyond the surface of the wood or other material adjacent to a window-opening is a fixture and in no sense portable. The terminal is also provided at or near its upper or closed end with a seat to receive and hold the bolt shank and head and at its lower end with an eye as a suitable means for attaching the terminal to a stay of a portable safety-belt, jacket, or fire-escape.

The locking, blocking, retaining, detaining, and keying features of my invention, as shown, are automatic in principle, being brought into action automatically by the mere engagement of the terminal with the protruding bolt-head and having to do with or being dependent upon the projecting head of the lag-screw or bolt and its relations to the portable terminal. On the way to its seat in, on, at, or near the upper and closed end of the slot the head of the bolt passes under and lifts the spring *d*, which is an integral part of the terminal and permits the spring to drop after the head of the bolt has passed. The projecting head of the bolt is left free in its seat; but the bolt cannot accidentally escape from the slot and release the terminal because the end of the spring extending across the slot blocks the passage and retains the terminal on the bolt. Nevertheless the terminal is free at all times to swing laterally, outwardly, and in a complete circle on the bolt.

The disengagement of the terminal plate from the protruding bolt-head or bolt is accomplished by or through the reversal of the above-described longitudinal engaging movement in the longitudinal plane of the longitudinal slot in the terminal after freeing the head of the bolt from the blocking, keying, or retaining control of the retaining device by a proper adjustment of the parts.

It is of course to be understood that the stay C of the jackets or belts F is provided with slotted terminals A or A′ and that the jacket or belt being applied to and worn upon the person of the cleaner, who goes from window to window in order to clean them, each one of the terminals is intended to be used in combination with a protruding bolt-head at the side of any number of windows of a series, however numerous, or, in fact, with the single or double protruding bolt-heads of any number of windows of any number of buildings that may be equipped with or for my safety apparatus.

In Fig. 2 I have shown a modification in which I preferably make the slotted plate hereinbefore shown the terminal or anchorage of the portable balcony E, of which *h* and *h′* are pendent bracket-arms, being the long arms of two triangular geometrical figures. $h^2$ and $h^3$ are the short arms of said figures, while $h^4$ and $h^5$ are the hypotenuse to the same. One of said geometrical figures is detachable and is shown in position outside of the section of a window. The other, by means of eyebolts or staples *m* and *m′*, is secured, hinge fashion, to a footboard *i*. *j* and *j′* are standards secured to said footboard and supporting-guard *k*. Said guard has pail-hook *l* and *l′*. Said footboard should end in extensions *n* and *n′* in order that when both brackets are in position upon the outside of a window and extension *n* is inserted into the detachable brackets and made to rest upon the horizontal arm $h^2$ said extensions *n* and *n′* are adapted to rest, respectively, against the outside wall upon the respective sides of the window. The inward tendency, when weighted by a person standing upon said structure, tends to keep it in a rigid position. In combination with said portable balcony I may use my safety-jacket herein shown, but differing in that the rope-terminals to the jackets may be ordinary snap-hooks *s* and *s′*, adapted to engage with the perforated enlargement of the hereinbefore-mentioned portable slotted plate, there being ample space for the respective balcony-brackets and snap-hooks. Said combination of lag-bolts and slotted plate will also make an admirable anchorage for portable fire-escapes. Furthermore, my several years' experience with safeties for window-cleaners in operating Patent No. 474,586 leads me to adhere to canvas jackets or belts in preference to leather, with the latter's attendant buckles.

Having thus fully described my invention, I will now in claims point out what is new and novel.

1. The herein-described safety apparatus for window-cleaners, consisting of the combination, of the two or more protruding headed bolts, and the slotted plate adapted to carry the rope, said slotted plate having the single longitudinal slot therein, engaging both said bolts, said slot extending through the end of the window-frame engaging part of the plate and being bridged by the part bearing the ring or means for attaching a rope.

2. The herein-described safety apparatus for window-cleaners consisting of the combination, of the protruding headed bolts, the slotted plate engaging said bolts, and the spring or similar devices by which said plate is keyed to said bolts, all substantially as shown and described.

3. In a safety apparatus the combination, with a rope sliding freely in a ropeway secured about the body of a window-cleaner, of the rope-terminal having a slotted plate *a*; bolt-way *b* and *b'*; bench *c*; spring-plate *d* and thimbled rope-eye *f'*, adapted to engage with the protruding headed bolt secured into the window-frame, substantially as and for the purpose set forth.

4. In a safety apparatus the combination, with a rope sliding freely in a ropeway secured about the body of a window-cleaner, of the rope-terminal having a slotted plate *a*; bolt-way *b* and *b'*; bench *c*; spring-plate *d*; thimbled rope-eye *f'*; herring-bone $a^4$; pail-hook *e* adapted to engage with the protruding headed bolt secured into the window-frame, substantially as and for the purpose set forth.

5. In a safety apparatus as herein shown and described, a balcony or seat E, having a footboard *i*, adapted to engage with bracket-arms $h^4$, $h^5$, and bracket-arms $h$, $h'$, $h^2$, $h^3$, with their terminal slotted plates adapted to engage with protruding headed bolts, secured into the sides of a window-frame and with snap-hooks *s*, *s'*, the rope-terminals of a safety-jacket as a means of anchorage for said balcony and for said jacket and in combination with means for securing said jacket about the person of a window-cleaner substantially as and for the purpose set forth.

6. The herein-described safety apparatus for window-cleaners, consisting of the combination of the protruding headed bolts, the slotted plate engaging said bolts, and the spring or device, operable when the plate is swung out or in at an angle, by which said plate is keyed to said bolts, all substantially as shown and described.

7. The herein-described safety apparatus for window-cleaners, consisting of the combination of the protruding headed bolts, a slotted plate engaging said bolts and a spring by which said plate is keyed to said bolts, substantially as shown and described.

8. In a safety apparatus, the combination of elements consisting of a protruding headed bolt, a slotted terminal engaging said bolt by a longitudinal movement, and means by which said terminal is keyed to said bolt while permitting the terminal to swing on the bolt, all substantially as shown and described.

9. In a safety apparatus, the combination of elements consisting of a protruding headed bolt, a slotted terminal engaging said bolt by a longitudinal movement, and means by which said terminal is keyed to said bolt, all substantially as shown and described.

10. In a safety apparatus, the combination of elements consisting of a protruding headed bolt, a slotted terminal engaging the bolt by an essentially longitudinal movement and capable of swinging laterally on said bolt, and means that will block the passage of the protruding head of said bolt and prevent its accidental escape from the slot without interfering with the slotted terminal's capability of swinging, substantially as shown and described.

11. In a safety apparatus, the combination of elements consisting of a protruding bolt-head, a slotted terminal engaging said bolt-head by a longitudinal movement, and means by which said terminal is always keyed to the bolt either when in position or at an angle with such longitudinal movement, all substantially as shown and described.

12. In a safety apparatus, the combination of elements consisting of a protruding bolt-head, a longitudinally-slotted terminal engaging said bolt-head by a longitudinal movement, and means that will block the passage and accidental escape of the bolt from the terminal while permitting the terminal to swing on the bolt, substantially as shown and described.

13. In a safety apparatus, the combination of elements consisting of a longitudinally-slotted terminal, a protruding bolt-head seated at the closed upper end of the slot of said terminal, a protruding bolt-head located in said slot adjacent to its lower and open end, and means by which said terminal is retained in engagement with said first-mentioned bolt-head while permitting the terminal to swing on the bolt, substantially as shown and described.

14. In a safety apparatus, the combination of elements consisting of a protruding bolt-head fixture, a portable terminal provided with a longitudinal slot open at one end to engage said fixture by a longitudinal movement, and also provided at that end with suitable means of attachment to a stay, substantially as shown and described.

15. In a safety apparatus, the combination of elements consisting of a protruding bolt-head fixture, a portable terminal provided with a longitudinal slot open at one end to engage and disengage said fixture by a longitudinal movement, and also provided at that end with suitable means of attachment to a stay, substantially as shown and described.

16. In a safety apparatus, the combination of elements consisting of a protruding bolt-head fixture located at the side of each one of a series of windows, a portable terminal provided with a longitudinal slot open at one end to engage said fixture in series by a longitudinal movement, and also provided at that end with suitable means of attachment to a stay, substantially as shown and described.

HIRAM K. WHITNER.

Witnesses:
HATTIE B. LEHMAN,
ALBERT JAMPOLIS.